United States Patent
Zhang et al.

(10) Patent No.: US 12,097,590 B1
(45) Date of Patent: Sep. 24, 2024

(54) WATER JET STRENGTHENING AND POLISHING INTEGRATED SYSTEM AND METHOD FOR BLADES OF BLISK

(71) Applicants: EAST CHINA UNIVERSITY OF SCIENCE AND TECHNOLOGY, Shanghai (CN); AECC COMMERCIAL AIRCRAFT ENGINE CO. LTD, Shanghai (CN); AECC HUNAN AVIATION POWERPLANT RESEARCH INSTITUTE, Zhuzhou (CN)

(72) Inventors: Xiancheng Zhang, Shanghai (CN); Shulei Yao, Shanghai (CN); Shantung Tu, Shanghai (CN); Yuxin Chi, Shanghai (CN); Yalong Chen, Shanghai (CN); Lizhang Zhang, Shanghai (CN); Fei Zeng, Shanghai (CN); Congyang Gong, Shanghai (CN); Ning Wang, Shanghai (CN); Junmiao Shi, Shanghai (CN); Yunfei Jia, Shanghai (CN); Shuang Liu, Shanghai (CN)

(73) Assignees: EAST CHINA UNIVERSITY OF SCIENCE AND TECHNOLOGY, Shanghai (CN); AECC COMMERCIAL AIRCRAFT ENGINE CO. LTD, Shanghai (CN); AECC HUNAN AVIATION POWERPLANT RESEARCH INSTITUTE, Zhuzhou (CN)

( * ) Notice: Subject to any disclaimer, the term of this patent is extended or adjusted under 35 U.S.C. 154(b) by 0 days.

(21) Appl. No.: 18/285,325

(22) PCT Filed: Apr. 10, 2023

(86) PCT No.: PCT/CN2023/087192
§ 371 (c)(1),
(2) Date: Oct. 2, 2023

(87) PCT Pub. No.: WO2024/007647
PCT Pub. Date: Jan. 11, 2024

(30) Foreign Application Priority Data

Jul. 5, 2022 (CN) .......................... 202210791091.X (51) Int. Cl.
*B24B 1/04* (2006.01)
*B24B 19/14* (2006.01)
(Continued)

(52) U.S. Cl.
CPC ................ *B24B 31/06* (2013.01); *B24B 1/04* (2013.01); *B24B 19/14* (2013.01); *B24B 31/003* (2013.01);
(Continued)

(58) Field of Classification Search
CPC ......... B24B 1/04; B24B 19/14; B24B 31/003; B24B 31/06; B24B 31/064; B24B 31/12;
(Continued)

(56) References Cited

U.S. PATENT DOCUMENTS

2002/0173239 A1* 11/2002 Hokkirigawa .......... B24C 11/00
451/36
2007/0107217 A1* 5/2007 Baus ..................... B24B 31/073
29/889.1
(Continued)

FOREIGN PATENT DOCUMENTS

CN 105058247 A 11/2015
CN 106413989 A 2/2017
(Continued)

*Primary Examiner* — Eileen P Morgan
(74) *Attorney, Agent, or Firm* — Troutman Pepper Hamilton Sanders LLP; Christopher C. Close, Jr.

(57) ABSTRACT

A water jet strengthening and polishing integrated system for blades of a blisk includes a vibration polishing unit and
(Continued)

a water jet strengthening unit. The vibration polishing unit includes a vibration polishing bath, the vibration polishing bath is internally provided with a clamp for clamping the blisk, and vibration motors for driving the vibration polishing bath to vibrate are installed on the vibration polishing bath. Top ends of support springs are fixedly connected with the vibration polishing bath, and bottom ends of the support springs are fixedly connected with a workbench. The water jet strengthening unit includes a water jet strengthening device for carrying out water jet strengthening on the blades of the blisk and a driving mechanism for clamping the water jet strengthening device and capable of driving the water jet strengthening device to move in any direction in space.

18 Claims, 4 Drawing Sheets

(51) Int. Cl.
| | | |
|---|---|---|
| *B24B 31/00* | (2006.01) | |
| *B24B 31/06* | (2006.01) | |
| *B24B 31/12* | (2006.01) | |
| *B24C 3/22* | (2006.01) | |
| *B24C 3/28* | (2006.01) | |
| *B24C 5/00* | (2006.01) | |

(52) U.S. Cl.
CPC ............ *B24B 31/064* (2013.01); *B24B 31/12* (2013.01); *B24C 3/22* (2013.01); *B24C 3/28* (2013.01); *B24C 5/005* (2013.01)

(58) Field of Classification Search
CPC .... B24C 1/04; B24C 3/12; B24C 3/20; B24C 3/22; B24C 3/26; B24C 3/28; B24C 5/005; B24C 5/02; B24C 5/04; B24C 7/0007; B24C 7/0038; B24C 7/0046; B24C 7/0076
USPC ... 451/32, 33, 34, 35, 36, 38, 57, 82, 84, 85
See application file for complete search history.

(56) References Cited

U.S. PATENT DOCUMENTS

| | | | |
|---|---|---|---|
| 2011/0179844 A1 | 7/2011 | Henng et al. | |
| 2017/0361422 A1 * | 12/2017 | Brand ........................ | B24C 1/08 |
| 2019/0337120 A1 * | 11/2019 | Brand ........................ | B24C 5/02 |

FOREIGN PATENT DOCUMENTS

| | | | | |
|---|---|---|---|---|
| CN | 107791157 A | 3/2018 | | |
| CN | 109202743 A | 1/2019 | | |
| CN | 109382767 A | 2/2019 | | |
| CN | 109848867 A | 6/2019 | | |
| CN | 112192447 A | 1/2021 | | |
| CN | 112404913 A | 2/2021 | | |
| CN | 112936112 A | 6/2021 | | |
| CN | 113246030 A | 8/2021 | | |
| CN | 113458879 A | 10/2021 | | |
| CN | 113561069 A | 10/2021 | | |
| CN | 215148176 U | 12/2021 | | |
| CN | 113953979 A | 1/2022 | | |
| CN | 115179178 A | 10/2022 | | |
| DE | 19529749 A1 * | 2/1997 | ............ | B08B 3/024 |
| DE | 102006058679 A1 * | 6/2008 | ............ | B24C 1/10 |
| EP | 0758572 A1 | 2/1997 | | |
| JP | H05111874 A | 5/1993 | | |
| RU | 2069618 C1 | 11/1996 | | |
| WO | WO-2015055601 A1 * | 4/2015 | ............ | B24B 1/04 |

* cited by examiner

WATER JET STRENGTHENING AND POLISHING INTEGRATED SYSTEM AND METHOD FOR BLADES OF BLISK

This application is a national stage application of International Patent Application No. PCT/CN2023/087192, filed on Apr. 10, 2023, which claims priority of Chinese Patent Application No. 202210791091.X, filed with the China National Intellectual Property Administration on Jul. 5, 2022, the disclosure of which is incorporated by reference herein in its entirety as part of the present application.

TECHNICAL FIELD

The present disclosure relates to the technical field of surface strengthening treatment, in particular to a water jet strengthening and polishing integrated system and method for blades of a blisk.

BACKGROUND

The blisk is an integral part composed of a main blisk and multiple blades uniformly distributed along the circumference. As a key part in advanced aero-engines, the blisk plays a vital role in improving the aerodynamic efficiency, thrust-to-weight ratio and reliability of aero-engines. Blades of the blisk are of complex curved surface and thin-walled characteristics, and the space between the blades is limited. However, the blisk has been served in the extreme working environments of high temperature, high pressure, high speed and corrosive medium for a long time, and fatigue failure easily occurs on the blisk, especially at the weak inlet and exhaust edges of blade surfaces.

Surface mechanical strengthening is an effective anti-fatigue surface modification technology. The basic principle is that by extruding or impacting the material surface, the surface layer of the material is plastically deformed, a plastic layer is formed, and beneficial residual compressive stress is introduced. At the same time, the material is compact due to the machining, and then the hardness of the surface layer of the material is improved. It has been proved that effective surface strengthening technology can reduce the local stress concentration on the surface, improve the surface integrity of the workpiece, and then significantly improve the fatigue resistance, wear resistance and corrosion resistance of the workpiece. Shot peening, laser shock strengthening and ultrasonic rolling strengthening are commonly used in blade surface strengthening. The development of shot peening and laser shock strengthening technologies is relatively mature, and it has been reported that the technologies are applied to the surface strengthening of the blisk. However, on one hand, due to the limitation of the structure of an ultrasonic rolling head, it is difficult to strengthen the blisk by ultrasonic rolling. On the other hand, the surface roughness of the workpiece after shot peening and laser shock strengthening is relatively high, which seriously affects the aerodynamic performance of the blades. Therefore, the workpiece after shot peening and laser shock strengthening needs to be polished again to reduce the surface roughness. For example, the invention patent with the Application No. CN202011087257.7 proposes a machining technology including coarse and fine one-time milling, vibration finishing, blade laser strengthening, blade shot peening, and vibration finishing, but the machining efficiency is undoubtedly reduced, and the machining cost is increased.

The water jet surface strengthening technology has been concerned all over the world because of high accessibility, simple operation, low cost and environmental protection in confined space. The existing water jet surface strengthening technology includes pure water jet strengthening, cavitation jet strengthening, pulsed water jet strengthening and abrasive water jet strengthening. It has been proved that the water jet surface strengthening technology can produce obvious plastic deformation and grain refinement on the surface of the treated workpiece, beneficial residual compressive stress is introduced, the surface hardness is improved. Lower surface roughness than that in shot peening and laser shock strengthening under optimized jet process parameters can be obtained. First of all, the surface roughness treated by the existing water jet strengthening technology cannot meet the needs of the blade surfaces of the blisk. Secondly, due to the small space between the blades of the blisk, the splashing of a jet medium (such as water or abrasive particles) in the traditional water jet strengthening process of the blades can cause adverse effects on other blade surfaces.

SUMMARY

The present disclosure aims to provide a water jet strengthening and polishing integrated system and method for blades of a blisk so as to solve the problems in the prior art, so that the surface strengthening quality and efficiency of blades of a blisk are improved.

In order to achieve the purpose, the present disclosure provides the following solutions.

The present disclosure provides a water jet strengthening and polishing integrated system for blades of a blisk, including a vibration polishing unit and a water jet strengthening unit.

The vibration polishing unit comprises a vibration polishing bath, the vibration polishing bath is internally provided with a clamp for clamping the blisk, and vibration motors for driving the vibration polishing bath to vibrate are installed on the vibration polishing bath: the vibration polishing unit further comprises at least three support springs, top ends of the support springs are fixedly connected with the vibration polishing bath, and bottom ends of the support springs are fixedly connected with a workbench.

The water jet strengthening unit comprises a water jet strengthening device for carrying out water jet strengthening on the blades of the blisk, and a driving mechanism for clamping the water jet strengthening device and capable of driving the water jet strengthening device to move in any direction in space.

Preferably, the water jet strengthening device comprises a high-pressure water inlet pipe, a diverter valve and an abrasive-particle-mixed connecting valve, two abrasive particle mixing cavities which are isolated from each other are formed in the abrasive-particle-mixed connecting valve, one end of the high-pressure water inlet pipe and one end of each abrasive particle mixing cavity communicate with the diverter valve, each abrasive particle mixing cavity communicates with an abrasive particle inlet, and one end, away from a corresponding abrasive particle mixing cavity, of each abrasive particle inlet is connected with an abrasive particle feed pipe. And an other end of each abrasive particle mixing cavity is fixedly connected with a jet pipe, one end, away from the abrasive particle mixing cavity, of the jet pipe is provided with a jet nozzle, the jet nozzle on one jet pipe corresponds to the jet nozzle on another jet pipe, and two corresponding jet nozzles are oppositely arranged.

Preferably, the two abrasive particle mixing cavities are formed in the abrasive-particle-mixed connecting valve, and the diverter valve is a three-way diverter valve; and each abrasive particle mixing cavity communicates with the diverter valve through a high-pressure diverter pipe.

Preferably, the water jet strengthening and polishing integrated system for blades of a blisk further includes a water tank, and the vibration polishing bath and the workbench are both arranged in the water tank, and the workbench is fixedly connected with the water tank.

Preferably, the water jet strengthening and polishing integrated system for blades of a blisk further includes a blisk rotating unit. The blisk rotating unit includes a vertical rotary table fixedly arranged on the workbench and located below the vibration polishing bath. The clamp is coaxial with the blisk, the clamp is fixedly connected with a rotating disc of the vertical rotary table. A rotary table servo motor for driving the rotating disc to rotate is arranged on the vertical rotary table.

Preferably, the rotating disc is in rotary sealing connection with a base plate of the vibration polishing bath through a sealing transition ring.

Preferably, the driving mechanism adopts a six-degree-of-freedom mechanical arm. A number of the vibration motors is four.

Preferably, the vibration motor, the rotary table servo motors and the driving mechanism are respectively electrically connected with a controller, and the controller is arranged in an electric control cabinet.

The present disclosure also provides a water jet strengthening and polishing integrated method for blades of a blisk, and the method is implemented based on the water jet strengthening and polishing integrated system for blades of a blisk. The method includes: clamping the blisk to be treated by the clamp, filling the vibration polishing bath with a grinding fluid, driving the vibration polishing bath to vibrate by the vibration motors, and driving the water jet strengthening device to move by the driving mechanism so as to sequentially carry out water jet strengthening on all the blades of the blisk.

Preferably, when the water jet strengthening device is driven by the driving mechanism to carry out water jet strengthening on a single blade, positioning one jet nozzle to directly face a front of the blade and an other jet nozzle to directly face a back of the blade, wherein a distance between the one jet nozzle and the blade and a distance between the other jet nozzle and the blade to be equal.

Compared with the prior art, the present disclosure has the following technical effects.

According to the water jet strengthening and polishing integrated system and method for blades of a blisk, the surface strengthening quality and efficiency of blades of a blisk are effectively improved. According to the water jet strengthening and polishing integrated system and method for blades of a blisk, the blades of a blisk are machined in a water jet surface strengthening mode with bilateral symmetry, so that the thin-walled blades can be prevented from being deformed due to uneven stress. Vibration polishing and bilateral water jet surface strengthening are carried out at the same time, thus realizing the effect of water jet strengthening and polishing integration. Vibration polishing and bilateral water jet surface strengthening interact with each other on the blade surface. On one hand, an abrasive material in a vibration polishing module can effectively prevent the splashing of a jet medium in the water jet strengthening process of the blades, thus avoiding surface damage caused by the splashing jet medium hitting other parts. On the other hand, high-speed bilateral water jet strengthening is carried out on the blade surfaces in the abrasive material, the movement of the abrasive material is accelerated, so that a better vibration polishing effect is achieved. In addition, according to the bilateral water jet strengthening and polishing integrated control method for blades of a blisk, the bilateral nozzles act on the surfaces of the bilateral blades uniformly as much as possible, and the surface strengthening and polishing of the blisk can be realized by calibrating and planning the trajectory of a single blade, so that slight deformation of blades due to uneven stress is effectively avoided, and the efficiency of surface treatment of the blisk is greatly improved.

BRIEF DESCRIPTION OF THE DRAWINGS

To more clearly illustrate the present embodiment of the present disclosure or the technical scheme in the prior art, the following briefly introduces the attached figures to be used in the present embodiment. Apparently, the attached figures in the following description show merely some embodiments of the present disclosure, and those skilled in the art may still derive other drawings from these attached figures without creative efforts.

Reference signs: 1, six-degree-of-freedom mechanical arm: 2, water tank: 21, workbench; 3, vibration polishing bath: 31, support spring: 32, vibration motor: 33, spring seat: 34, sealing transition ring: 4, vertical rotary table: 41, rotary table servo motor: 42, rotating disc: 5, water jet strengthening device: 51, jet pipe: 52, abrasive particle feed pipe: 53, high-pressure water inlet pipe: 54, jet outlet axis: 6, clamp: 7, blisk: 71, blade inlet edge line: 72, blade exhaust edge line; 73, blade growth direction line: 74, blade thickness curve; and 8, electric control cabinet.

DETAILED DESCRIPTION OF THE EMBODIMENTS

The following clearly and completely describes the technical scheme in the present embodiments of the present disclosure with reference to the attached figures in the present embodiments of the present disclosure. Apparently, the described embodiments are merely a part rather than all of the present embodiments of the present disclosure. Based on the present embodiment in the present disclosure, all other embodiments obtained by the ordinary technical staff in the art under the premise of without contributing creative labor belong to the scope protected by the present disclosure.

The present disclosure aims to provide a water jet strengthening and polishing integrated system and method for blades of a blisk so as to solve the problems in the prior art, so that the surface strengthening quality and efficiency of blades of a blisk are improved.

To make the foregoing objective, features and advantages of the present disclosure clearer and more comprehensible, the present disclosure is further described in detail below with reference to the attached figures and specific embodiments.

As shown in FIGS. 1 to 6, the embodiment provides a water jet strengthening and polishing integrated system for blades of a blisk, including a vibration polishing unit, a blisk rotating unit and a water jet strengthening unit.

Figure 1:
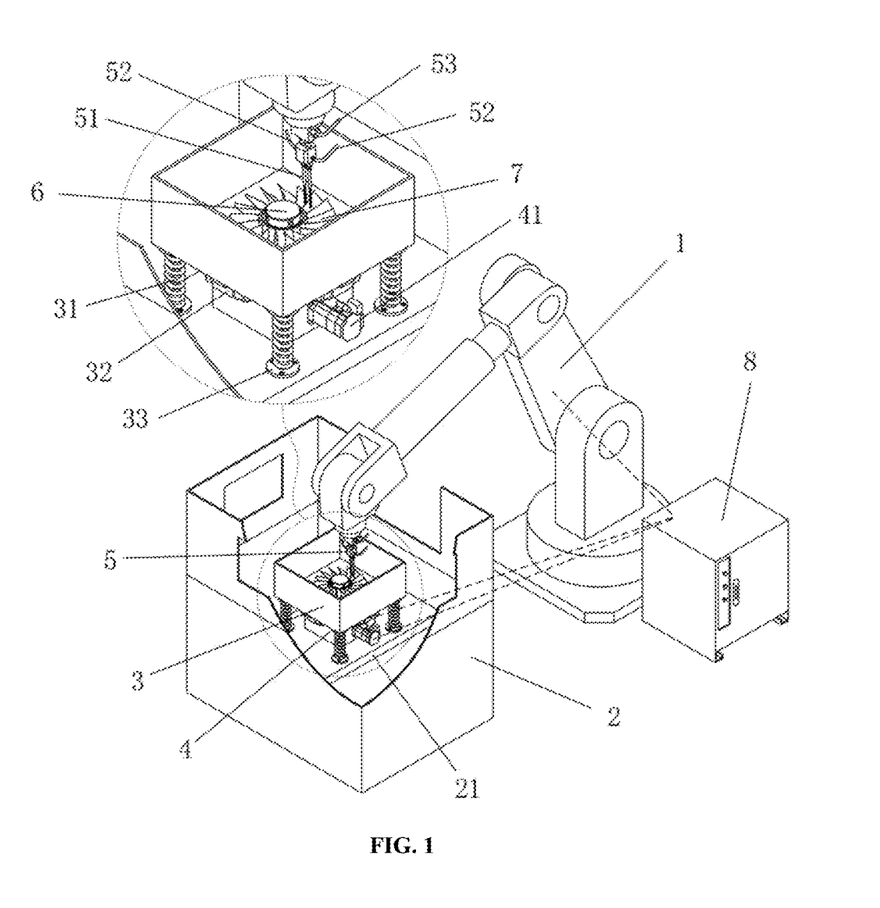
FIG. 1 is a structural schematic diagram of a water jet strengthening and polishing integrated system for blades of a blisk in the present disclosure.
Figure 2:
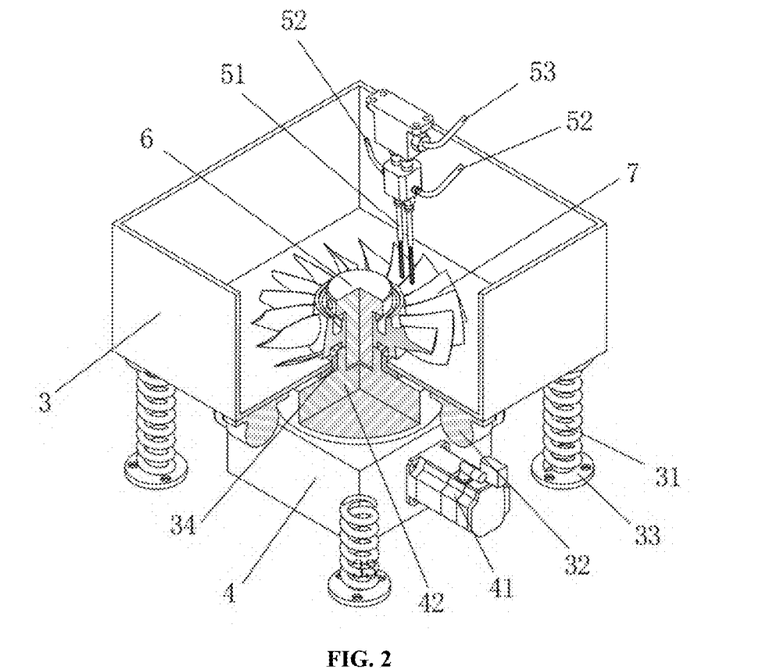
FIG. 2 is a part sectioned view of the water jet strengthening and polishing integrated system for blades of a blisk in the present disclosure.
Figure 3:
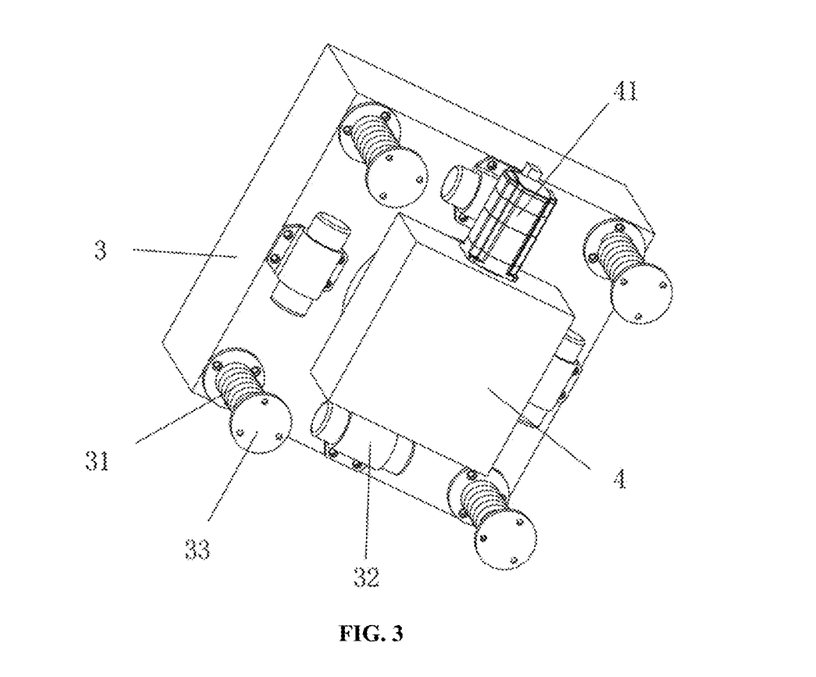
FIG. 3 is an upward view of FIG. 2.

The vibration polishing unit includes a vibration polishing bath 3. The vibration polishing bath 3 is internally provided with a clamp 6 for clamping a blisk 7. Four vibration motors 32 for driving the vibration polishing bath 3 to vibrate are installed on the vibration polishing bath 3. The four vibration motors 32 are uniformly distributed below the vibration polishing bath 3. Support springs 31 are respectively arranged at the bottom of four corners of the vibration polishing bath 3. The top ends of the support springs 31 are fixedly connected with the vibration polishing bath 3, and bottom ends of the support springs 31 are fixedly connected with a workbench 21 through a spring seat 33. The vibration polishing bath 3 and a workbench 21 are both arranged in a water tank 2, and the workbench 21 is fixedly connected with the water tank 2.

Water and an abrasive material are added into the vibration polishing bath 3 to form an abrasive fluid. The vibration polishing bath 3 can be vibrated by turning on the vibration motors 32, and the vibration polishing bath 3 drives the clamp 6 and the blisk 7 to vibrate relative to the abrasive fluid, thus completing polishing treatment for the blades of a blisk.

The blisk rotating unit includes a vertical rotary table 4 fixedly arranged on the workbench 21 and located below the vibration polishing bath 3. The clamp 6 is coaxial with the blisk 7. The clamp 6 is fixedly connected with a rotating disc 42 of the vertical rotary table 4. A rotary table servo motor 41 for driving the rotating disc 42 to rotate is arranged on the vertical rotary table 4.

The rotating disc 42 is in rotary sealing connection with a base plate of the vibration polishing bath 3 through a sealing transition ring 34.

The water jet strengthening unit includes a water jet strengthening device 5 for carrying out water jet strengthening on blades of the blisk 7 and a driving mechanism for clamping the water jet strengthening device capable of driving the water jet strengthening device 5 to move in any direction in space. The driving mechanism adopts a six-degree-of-freedom mechanical arm 1.

Figure 5:
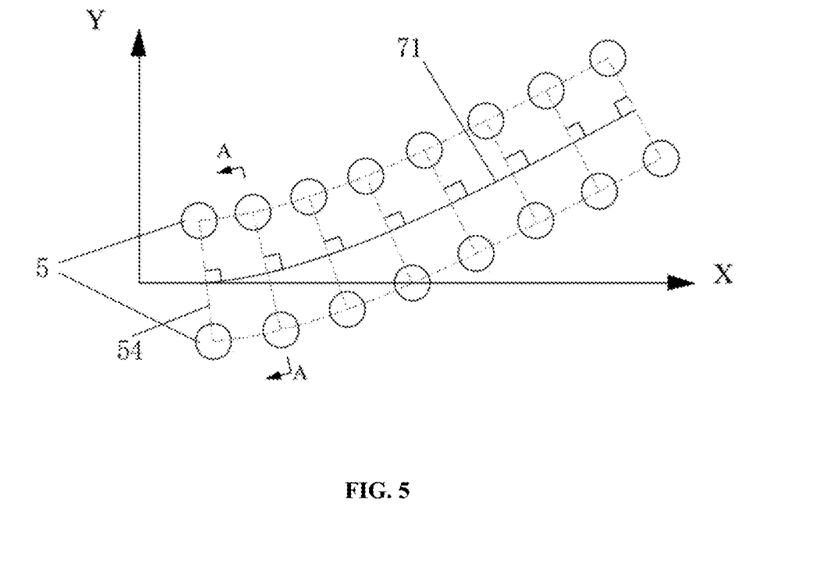
FIG. 5 is a structural schematic diagram of a water jet strengthening device moving along a blade inlet edge line in the water jet strengthening and polishing integrated method for blades of a blisk in the present disclosure in the present disclosure.

In the embodiment, the water jet strengthening device 5 includes a high-pressure water inlet pipe 53, a diverter valve and an abrasive-particle-mixed connecting valve. Two abrasive particle mixing cavities which are isolated from each other are formed in the abrasive-particle-mixed connecting valve. One end of the high-pressure water inlet pipe 53 and one end of each abrasive particle mixing cavity communicate with the diverter valve. Each abrasive particle mixing cavity communicates with an abrasive particle inlet. Onr end, away from the corresponding abrasive particle mixing cavity, of each abrasive particle inlet is connected with an abrasive particle feed pipe 52. An other end of each abrasive particle mixing cavity is fixedly connected with a jet pipe 51. One end, away from the abrasive particle mixing cavity, of the jet pipe 51 is provided with a jet nozzle. The jet nozzle on one jet pipe 51 corresponds to the jet nozzle on the other jet pipe 51. The two corresponding jet nozzles are oppositely arranged. Two abrasive particle mixing cavities are formed in the abrasive-particle-mixed connecting valve, and the diverter valve is a three-way diverter valve. The abrasive particle mixing cavity communicates with the diverter valve through a high-pressure diverter pipe.

The vibration motors 32, the rotary table servo motor 41 and the driving mechanism are respectively electrically connected with a controller. The controller is arranged in an electric control cabinet 8 and controls the vibration motors 32, the rotary table servo motor 41 and the driving mechanism.

The present disclosure also provides a water jet strengthening and polishing integrated method for blades of a blisk, which is implemented based on the water jet strengthening and polishing integrated system for blades of a blisk. The method includes the following steps. A blisk 7 to be treated is clamped by the clamp 6. A vibration polishing bath 3 is filled with a grinding fluid. The vibration polishing bath 3 is driven by the vibration motors 32 to vibrate. At the same time, a water jet strengthening device 5 is driven by a driving mechanism to move so as to sequentially carry out water jet strengthening on all blades of the blisk 7.

Figure 6:
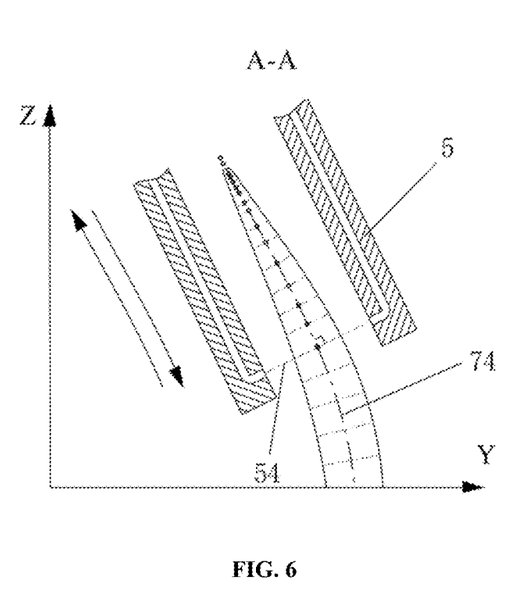
FIG. 6 is a schematic diagram of the water jet strengthening device moving along a blade thickness curve in the water jet strengthening and polishing integrated method for blades of a blisk in the present disclosure in the present disclosure.

When the water jet strengthening device 5 is driven by the driving mechanism to carry out water jet strengthening on a single blade, two jet nozzles are respectively positioned at two sides of the single blade. One jet nozzle directly face the front of the blade, an other jet nozzle directly face the back of the blade, and the distance between the one jet nozzle and the blade and the distance between the other jut nozzle and the blade are equal.

Specifically: an inlet edge of the strengthened blade is taken as an example. Firstly, a blade cross-sectional profile (as shown in FIG. 6) is obtained by slicing layer by layer along the perpendicular direction of a blade inlet edge line 71, and a blade thickness curve 74 is obtained through the blade cross-sectional profile. During machining, on one hand, jet outlet axes 54 of the two jet nozzles are always perpendicular to the blade inlet edge line 71. And on the other hand, the central points of the jet outlet axes 54 of the two jet nozzles are always located on the blade thickness curve 74, and the jet outlet axes 54 of the two jet nozzles are perpendicular to the blade thickness curve 74. The water jet strengthening device 5 is constantly adjusted in posture to ensure to be perpendicular to the blade thickness curve 74 during upward and downward movement in the blade width direction, and is constantly adjusted to be perpendicular to the blade inlet edge line 71 during movement from the blade root to the blade tip or from the blade tip to the blade root to ensure that the jet outlet axes 54 of the two jet nozzles are perpendicular to the blade inlet edge line 71.

An exhaust edge of the strengthened blade is taken as an example. Firstly, a blade cross-sectional profile obtained by slicing layer by layer along the perpendicular direction of a blade exhaust edge line 72, and the blade thickness curve 74 is obtained through the blade cross-sectional profile. During machining, on one hand, jet outlet axes 54 of the two jet nozzles are always perpendicular to the blade exhaust edge line 72. And on the other hand, the central points of the jet outlet axes 54 of the two jet nozzles are always located on the blade thickness curve 74, and the jet outlet axes 54 of the two jet nozzles are perpendicular to the blade thickness curve 74. The water jet strengthening device 5 is constantly adjusted in posture to ensure that the jet outlet axis 54 is perpendicular to the blade thickness curve 74 during upward and downward movement in the blade width direction, and is constantly adjusted to be perpendicular to the blade inlet edge line 72 during movement from the blade root to the blade tip or from the blade tip to the blade root to ensure that the jet outlet axes 54 of the two jet nozzles are perpendicular to the blade exhaust edge line 72.

It should be noted that the strengthening effect is the best when the jet nozzles are perpendicular to the machined surface. However, since the front and back surfaces of the blades are curved, and the two nozzles of the water jet strengthening device 5 are opposite and coaxial in the embodiment, it is impossible to ensure that the two jet nozzles located at both sides of the blade are perpendicular to the surface of the opposite blade at the same time. Therefore, two constraint conditions are given in the embodiment. One constraint condition is that the water jet strengthening device 5 is constantly adjusted in posture in the process of moving up and down along the width direction of the blade to ensure that the jet outlet axis 54 is perpendicular to the blade thickness curve 74. The other constraint condition is that the water jet strengthening device 5 is constantly adjusted in posture when moving from the blade root to the blade tip or from the blade tip to the blade root to ensure that the jet outlet axes 54 of the two jet nozzles are perpendicular to the blade inlet edge line 71 or the blade exhaust edge line 72, so that the two jet nozzles are approximately perpendicular to the corresponding blade surfaces as much as possible to ensure the strengthening effect on the blade surfaces.

Figure 4:
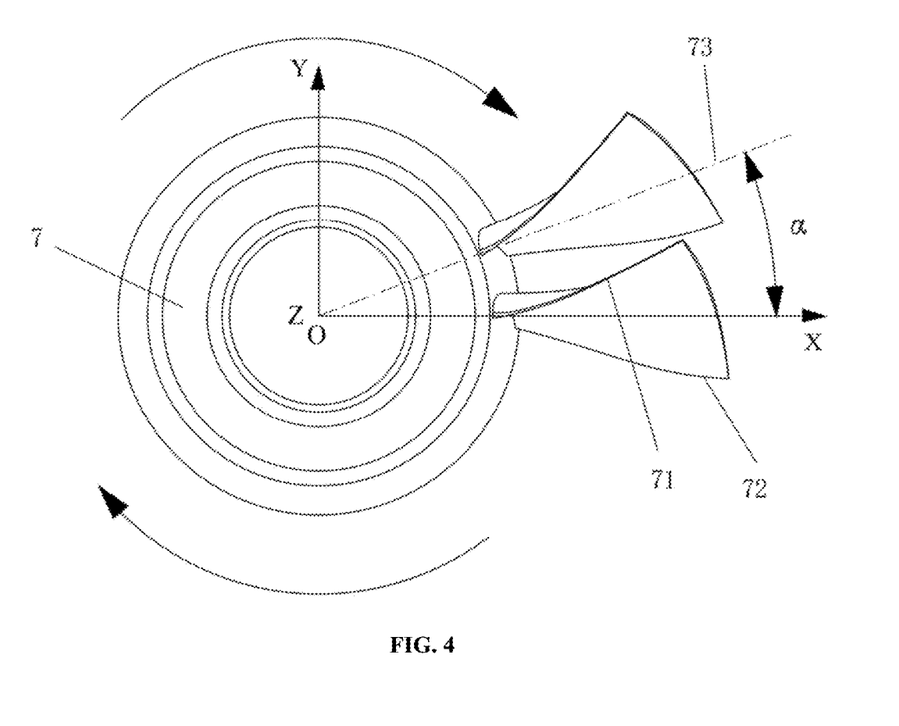
FIG. 4 is a schematic diagram of blisk rotation in a water jet strengthening and polishing integrated method for blades of a blisk in the present disclosure.

Since the blades on the blisk 7 are uniformly distributed in the circumferential direction, after the single blade is cleaned, it is necessary to turn on the rotary table servo motor 41 to drive the clamp 6 and blisk 7 to rotate by an angle α through the rotating disc 42 of the rotary table. The angle α is the included angle between the blade growth direction lines 73 of two adjacent blades, and then the water jet strengthening device 5 is driven by the driving mechanism to carry out water jet strengthening on the next blade, until all the blades on the blisk 7 are strengthened.

In the description of the present disclosure, it needs to be illustrated that the indicative direction or position relations of the terms such as "inner" and "outer" are direction or position relations illustrated based on the attached figures, just for facilitating the description of the present disclosure and simplifying the description, but not for indicating or hinting that the indicated device or element must be in a specific direction and is constructed and operated in the specific direction, the terms cannot be understood as the restriction of the present disclosure.

Specific examples are used for illustration of the principles and implementation methods of the present disclosure. The description of the above-mentioned embodiments is used to help illustrate the method and the core principles of the present disclosure; and meanwhile, those skilled in the art can make various modifications in terms of specific embodiments and scope of application in accordance with the teachings of the present disclosure. In conclusion, the content of this specification shall not be construed as a limitation to the present disclosure.

What is claimed is:

1. A water jet strengthening and polishing integrated system for blades of a blisk, comprising a vibration polishing unit and a water jet strengthening unit, wherein
   the vibration polishing unit comprises a vibration polishing bath, the vibration polishing bath is internally provided with a clamp for clamping the blisk, and vibration motors for driving the vibration polishing bath to vibrate are installed on the vibration polishing bath; the vibration polishing unit further comprises at least three support springs, top ends of the support springs are fixedly connected with the vibration polishing bath, and bottom ends of the support springs are fixedly connected with a workbench; and
   the water jet strengthening unit comprises a water jet strengthening device for carrying out water jet strengthening on the blades of the blisk, and a driving mechanism for clamping the water jet strengthening device and capable of driving the water jet strengthening device to move in any direction in space;
   wherein the water jet strengthening device comprises a high-pressure water inlet pipe, a diverter valve and an abrasive-particle-mixed connecting valve, two abrasive particle mixing cavities which are isolated from each other are formed in the abrasive-particle-mixed connecting valve, one end of the high-pressure water inlet pipe and one end of each abrasive particle mixing cavity communicate with the diverter valve, each abrasive particle mixing cavity communicates with an abrasive particle inlet, and one end, away from a corresponding abrasive particle mixing cavity, of each abrasive particle inlet is connected with an abrasive particle feed pipe; and
   an other end of each abrasive particle mixing cavity is fixedly connected with a jet pipe, one end, away from the abrasive particle mixing cavity, of the jet pipe is provided with a jet nozzle, the jet nozzle on one jet pipe corresponds to the jet nozzle on another jet pipe, and two corresponding jet nozzles are oppositely arranged;
   wherein the two abrasive particle mixing cavities are formed in the abrasive-particle-mixed connecting valve, and the diverter valve is a three-way diverter valve; and each abrasive particle mixing cavity communicates with the diverter valve through a high-pressure diverter pipe.

2. The water jet strengthening and polishing integrated system for blades of a blisk according to claim 1, further comprising a water tank, wherein the vibration polishing bath and the workbench are both arranged in the water tank, and the workbench is fixedly connected with the water tank.

3. The water jet strengthening and polishing integrated system for blades of a blisk according to claim 1, further comprising a blisk rotating unit, wherein the blisk rotating unit comprises a vertical rotary table fixedly arranged on the workbench and located below the vibration polishing bath, the clamp is coaxial with the blisk, the clamp is fixedly connected with a rotating disc of the vertical rotary table, and a rotary table servo motor for driving the rotating disc to rotate is arranged on the vertical rotary table.

4. The water jet strengthening and polishing integrated system for blades of a blisk according to claim 3, wherein the rotating disc is in rotary sealing connection with a base plate of the vibration polishing bath through a sealing transition ring.

5. The water jet strengthening and polishing integrated system for blades of a blisk according to claim 3, wherein the driving mechanism adopts a six-degree-of-freedom mechanical arm; and a number of the vibration motors is four.

6. The water jet strengthening and polishing integrated system for blades of a blisk according to claim 5, wherein the vibration motors, the rotary table servo motor and the driving mechanism are respectively electrically connected with a controller, and the controller is arranged in an electric control cabinet.

7. A water jet strengthening and polishing integrated method for blades of a blisk, wherein the method is implemented based on the water jet strengthening and polishing integrated system for blades of a blisk according to claim 1, the method comprises:
   clamping the blisk to be treated by the clamp,
   filling the vibration polishing bath with a grinding fluid,
   driving the vibration polishing bath to vibrate by the vibration motors, and
   driving the water jet strengthening device to move by the driving mechanism so as to sequentially carry out water jet strengthening on all the blades of the blisk.

8. The water jet strengthening and polishing integrated method for blades of a blisk according to claim 7, wherein when the water jet strengthening device is driven by the driving mechanism to carry out water jet strengthening on a single blade,
   positioning one jet nozzle to directly face a front of the blade and an other jet nozzle to directly face a back of the blade, enabling a distance between the one jet nozzle and the blade and a distance between the other jet nozzle and the blade to be equal.

9. The water jet strengthening and polishing integrated method for blades of a blisk according to claim 7, further comprising a water tank, wherein the vibration polishing bath and the workbench are both arranged in the water tank, and the workbench is fixedly connected with the water tank.

10. The water jet strengthening and polishing integrated method for blades of a blisk according to claim 7, further comprising a blisk rotating unit, wherein the blisk rotating unit comprises a vertical rotary table fixedly arranged on the workbench and located below the vibration polishing bath, the clamp is coaxial with the blisk, the clamp is fixedly connected with a rotating disc of the vertical rotary table, and a rotary table servo motor for driving the rotating disc to rotate is arranged on the vertical rotary table.

11. The water jet strengthening and polishing integrated method for blades of a blisk according to claim 10, wherein the rotating disc is in rotary sealing connection with a base plate of the vibration polishing bath through a sealing transition ring.

12. The water jet strengthening and polishing integrated method for blades of a blisk according to claim 10, wherein the driving mechanism adopts a six-degree-of-freedom mechanical arm; and a number of the vibration motors is four.

13. The water jet strengthening and polishing integrated method for blades of a blisk according to claim 12, wherein the vibration motors, the rotary table servo motor and the driving mechanism are respectively electrically connected with a controller, and the controller is arranged in an electric control cabinet.

14. The water jet strengthening and polishing integrated method for blades of a blisk according to claim 9, wherein when the water jet strengthening device is driven by the driving mechanism to carry out water jet strengthening on a single blade,
   positioning one jet nozzle to directly face a front of the blade and an other jet nozzle to directly face a back of the blade, enabling a distance between the one jet nozzle and the blade and a distance between the other jet nozzle and the blade to be equal.

15. The water jet strengthening and polishing integrated method for blades of a blisk according to claim 10, wherein when the water jet strengthening device is driven by the driving mechanism to carry out water jet strengthening on a single blade,
   positioning one jet nozzle to directly face a front of the blade and an other jet nozzle to directly face a back of the blade, enabling a distance between the one jet nozzle and the blade and a distance between the other jet nozzle and the blade to be equal.

16. The water jet strengthening and polishing integrated method for blades of a blisk according to claim 11, wherein when the water jet strengthening device is driven by the driving mechanism to carry out water jet strengthening on a single blade,
   positioning one jet nozzle to directly face a front of the blade and an other jet nozzle to directly face a back of the blade, enabling a distance between the one jet nozzle and the blade and a distance between the other jet nozzle and the blade to be equal.

17. The water jet strengthening and polishing integrated method for blades of a blisk according to claim 12, wherein when the water jet strengthening device is driven by the driving mechanism to carry out water jet strengthening on a single blade,
   positioning one jet nozzle to directly face a front of the blade and an other jet nozzle to directly face a back of the blade, enabling a distance between the one jet nozzle and the blade and a distance between the other jet nozzle and the blade to be equal.

18. The water jet strengthening and polishing integrated method for blades of a blisk according to claim 13, wherein when the water jet strengthening device is driven by the driving mechanism to carry out water jet strengthening on a single blade,
   positioning one jet nozzle to directly face a front of the blade and an other jet nozzle to directly face a back of the blade, enabling a distance between the one jet nozzle and the blade and a distance between the other jet nozzle and the blade to be equal.

* * * * *